US006765991B1

(12) United States Patent
Hanuschak et al.

(10) Patent No.: US 6,765,991 B1
(45) Date of Patent: Jul. 20, 2004

(54) EMERGENCY TELECOMMUNICATION DEVICE

(76) Inventors: Michael Hanuschak, 3120 Jasmine Dr., Delray Beach, FL (US) 33483; Joseph A. Finley, Jr., 3031 Jasmine Ct., Delray Beach, FL (US) 33483; Michael Quigley, 10306 Bayberry La., Spotsylvania, VA (US) 22553

(*) Notice: Subject to any disclaimer, the term of this patent is extended or adjusted under 35 U.S.C. 154(b) by 237 days.

(21) Appl. No.: 09/887,555

(22) Filed: Jun. 22, 2001

Related U.S. Application Data

(60) Provisional application No. 60/213,789, filed on Jun. 23, 2000.

(51) Int. Cl.[7] .............................................. H04M 11/04
(52) U.S. Cl. .............................. 379/37; 379/40; 379/47
(58) Field of Search ........................ 379/37–40, 42–47, 379/49–51, 102.01, 102.06; 340/505–506, 571, 573; 348/558; 455/404.1, 404.2; 381/356

(56) References Cited

U.S. PATENT DOCUMENTS

| | | | | |
|---|---|---|---|---|
| 4,252,997 A | * | 2/1981 | Lodas et al. ................... | 379/40 |
| 4,262,283 A | | 4/1981 | Chamberlain et al. ....... | 340/533 |
| 4,510,350 A | | 4/1985 | Wagner et al. ................ | 379/38 |
| 4,760,593 A | | 7/1988 | Shapiro et al. ............... | 379/38 |
| 4,920,556 A | | 4/1990 | Wong ............................ | 379/51 |
| 4,937,855 A | * | 6/1990 | McNab et al. ........... | 379/102.06 |
| 5,195,126 A | | 3/1993 | Carrier et al. ................. | 379/45 |
| 5,235,630 A | | 8/1993 | Moody et al. ................. | 379/37 |
| 5,305,370 A | * | 4/1994 | Kearns et al. ................. | 379/45 |
| 5,333,172 A | | 7/1994 | Stevens ........................ | 379/38 |
| 5,337,343 A | * | 8/1994 | Stickney ....................... | 379/45 |
| 5,392,329 A | | 2/1995 | Adams et al. ................ | 379/49 |
| 5,589,818 A | * | 12/1996 | Queen .......................... | 340/506 |
| 5,673,304 A | | 9/1997 | Connor et al. ................ | 379/45 |
| 5,694,452 A | | 12/1997 | Bertolet ........................ | 379/51 |
| 6,035,187 A | * | 3/2000 | Franza ...................... | 455/404.1 |
| 6,150,942 A | * | 11/2000 | O'Brien .................... | 340/573.1 |
| 6,281,939 B1 | * | 8/2001 | Del Castillo et al. ........ | 348/558 |
| 6,373,942 B1 | * | 4/2002 | Braund ........................ | 379/430 |

FOREIGN PATENT DOCUMENTS

| | | | | | |
|---|---|---|---|---|---|
| DE | 19827562 A1 | * | 4/1999 | ........... | G08B/25/00 |
| JP | 04247757 A | * | 9/1992 | ........... | H04M/11/04 |

\* cited by examiner

*Primary Examiner*—George Eng
(74) *Attorney, Agent, or Firm*—Jon A. Gibbons; Fleit, Kain, Gibbons, Gutman, Bongini & Bianco P.L.

(57) ABSTRACT

An emergency telecommunications device that works with existing telephone lines to provide continuous hands-free two-way communication using a remote speaker with built-in microphone sensitivity that allows rescuers to use the device from a far distance. The device is activated with a pull or push of a single button activation mechanism, which instantly contacts emergency personnel who provide potentially life saving instruction to rescuers.

28 Claims, 8 Drawing Sheets

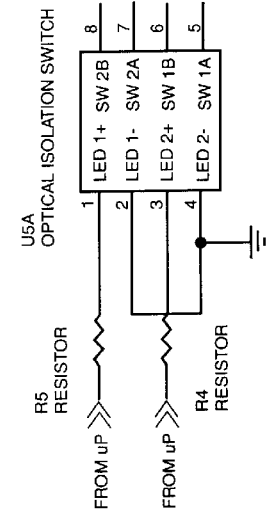
*FIG. 8*
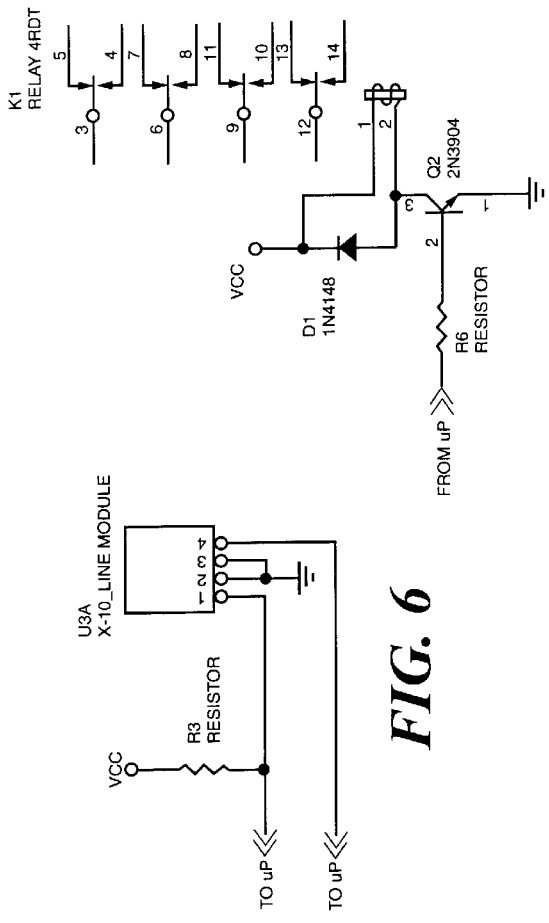
*FIG. 9*
*FIG. 6*
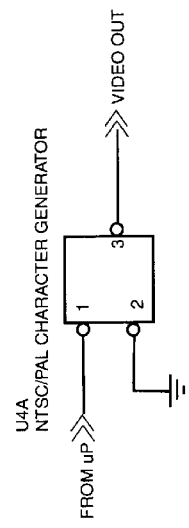
*FIG. 7*
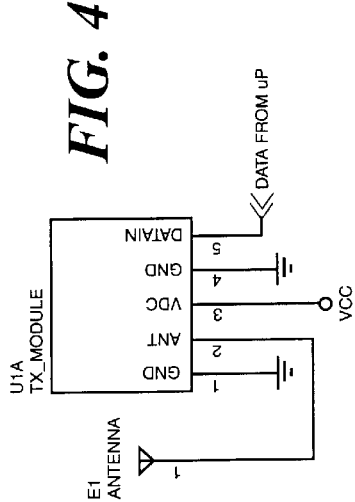
*FIG. 4*
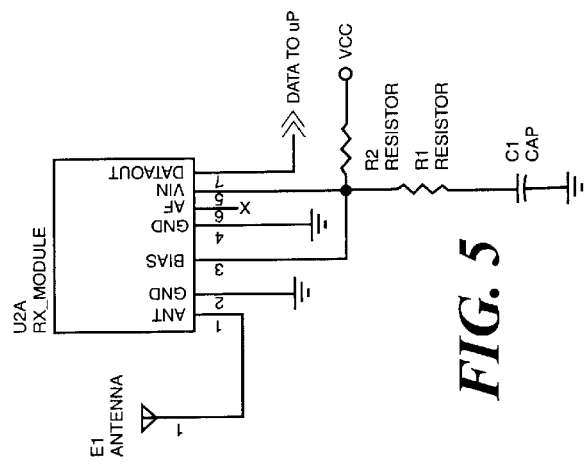
*FIG. 5*

EMERGENCY TELECOMMUNICATION DEVICE

CROSS REFERENCE TO RELATED APPLICATIONS

The non-provisional application is based on the provisional patent application serial No. 60/213,789 with inventors Michael Hanuschak et al., entitled "EMERGENCY TELECOMMUNICATION DEVICE" filed Jun. 23, 2000, which is hereby incorporated by reference in its entirety.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention generally relates to the field of emergency telecommunication devices, and more particularly to an automatic dialing device for medical response personnel.

BACKGROUND OF THE INVENTION

The availability of both private and public pools continues to grow. Pools offer therapeutic outlets from heat and humidity, water activities such as sports, and exercise to many people. As the availability of pools and the use of pools increase, so does the attendant risk of drowning accidents.

Although many owners and users of pools may be active with the American Red Cross to obtain necessary water safety training, there are many people without specialized training for victims of drowning accidents such as CPR and first aid. In fact most private owners of pools, pools in condominiums and many business owners of pools either let their certification for specialized pool training expire or are unaware of the lack of preparation and protection. The results of a pool accident are both personal and economic. Accordingly, there exists a need for a product that provides both the physical and economic protection against pool accidents.

Insurance coverage for hotels, Inns and motels often covers pools. It is common during the underwriting process for the question to arise, "Is there a pool?" An affirmative response to this question may preclude the underwriter from accepting the entire risk because the swimming pool is considered such an exposure to liability and wrongful death. In the more favorable situations there is a surcharge to the liability premium of several hundred or thousand dollars based on the specifics of the exposure. The basis of the concern is the number of times the plaintiffs' bar has used "failure to provide access to emergency equipment or lack of protection" as a pleading in a wrongful death or serious injury case. Very few commercial establishments have the budget to provide full-time credentialed water safety staff. The alternative is to post a "NO LIFEGUARD, SWIM AT YOUR OWN RISK" sign. However, many times, in recent law suits, warnings are not enough to have the owners and operators of hotels and motels avoid being held liable for compensatory and in exceptional cases punitive damages. In fact, it is common for the plaintiff's bar to accuse the property operator that either no telephone was available or that the person wishing to render aid had to stay on the phone, if one was available, but in either case they were not able to render immediate first aid because of the delay in contacting emergency services. Most hotels and motels have an internal phone system, which must run through the switchboard. If the front desk is busy and unable to answer an internal call for several minutes the damage to a drowning victim becomes exponential.

Accordingly, a need exists for a system to mitigate these problems and to provide a system that provides a defense against the pleadings by the plaintiffs' bar that improper or insufficient security devices were available to the invited guests thereby creating an unsafe environment for the invited guest.

Almost daily there is news coverage from television and newspaper about infant drownings or near-drowning accidents. One of the more sorrowful recent stories was of a mother who found her infant at the bottom of a pool and not knowing how to handle the situation, ran to a neighbor's house for assistance. The delay in looking for assistance led to the untimely death of the infant. A need exists for a device that instantly connects the mother with a trained professional who guides her through the rescue and life saving steps. The problem is obviously becoming a serious concern to the general public as a Florida State Representative, Debbie Wasserman Schultz of Weston is pressing for legislation that would mandate safety equipment for pools. According to an article in the Sun Sentinel dated Mar. 19, 2000, Florida ranks third in the nation in drownings. They also state that drowning is the leading cause of death among children younger than 4 in Florida. Unfortunately, most people do not know the proper emergency measures to be taken in a drowning incident. Accordingly, a need exists for a device to provide step-by-step assistance from trained personnel instantly to a caller.

Florida is home to one of the largest population of retirees in the United States. Those retirees may be easily confused and suffer from lack of agility as a consequence of aging. In an emergency situation involving an elderly individual and elderly rescuer the lack of knowledge combined with lack of direction can have fatal results. Most people of any age are familiar with the manual pull fire stations. There is no operational order to the activation other than pull the lever. A need exists for an emergency device that is as easy to use. If an emergency should occur poolside there is no need for the rescuer, to search for a phone, relay information on the calling location or remember where they happen to be at the moment. A device is needed that provides step-by-step instruction from a trained professional instantly.

Although other emergency telecommunication devices exist, none offer the same features and capabilities of the present invention. For example, one such device is disclosed in U.S. Pat. No. 5,694,452 entitled "Emergency Telecommunication Device" with inventor Eric E. Bertolet. This device does not provide a simple method to operate such as one button dialing and direct connection to trained emergency personnel. Moreover, this device will not operate correctly in a pool-side environment where enhanced audio pickup is needed for distances often as great as 25 feet from the emergency device. Accordingly, a need exists to overcome this problem.

SUMMARY OF THE INVENTION

The system disclosed herein is being marketed under the name "Lifeguard". The system is an emergency telecommunications device that works with existing telephone lines to provide a continuous hands-free remote speaker, with built-in microphone sensitivity to allow rescuers to use the device from a far distance. The rescuers can attend to the accident victim while being instructed and communicating with emergency personnel to speak and be heard while attending to the accident victim. The system allows activation with a pull or push of an activation mechanism, an automatic connection to EMS identifying the calling station as a drowning case and hands free two way communication between the person requesting assistance and the EMS station allowing the person activating the system to start first aid or receive instructions from a professional on the actions to be taken to mitigate threat to life.

In one embodiment, the system is microprocessor-based, enabling it to be easily adapted to specific operating requirements, which include incoming call-no answer; incoming call-auto answer; incoming call-manual answer; and outgoing call-panic mode. Further, the system operates in a stand-alone mode or networked with additional units to create a seamless coverage area. The system provides an instantaneous conduit between trained medical professionals and on-scene care givers. "Lifeguard" eliminates precious life-saving moments between the medical emergency and the medical treatment which is paramount in regards to victim survivability.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings.

FIGS. 4 and 5 are electrical schematics of an optional add-on to the circuitry of FIGS. 2 and 3 for wireless, two-way communication capabilities, according to the present invention.

FIG. 6 is an electrical schematic of an optional add-on to the circuitry of FIGS. 2 and 3 for X-10 communication capabilities, according to the present invention.

FIG. 7 is an electrical schematic of an optional add-on to the circuitry of FIGS. 2 and 3 for an NTSC/PAL character generator, according to the present invention.

FIG. 8 is an electrical schematic of an optional add-on to the circuitry of FIGS. 2 and 3 for a relay 4PDT module, according to the present invention.

FIG. 9 is an electrical schematic of an optional add-on to the circuitry of FIGS. 2 and 3 for an optical isolation switch, according to the present invention.

DESCRIPTION OF EXEMPLARY EMBODIMENTS

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The system disclosed herein is being marketed under the name "Lifeguard". The system is an emergency telecommunications device that works with existing telephone lines to provide a continuous hands-free remote speaker, with built-in microphone sensitivity to allow rescuers to use the device from a far distance. The rescuers can attend to the accident victim while being instructed by and communicating with emergency personnel. In other words, it gives rescuers the freedom to speak and be heard while attending to the accident victim. The system allows activation with a pull or push of an activation mechanism, an automatic connection to EMS identifying the calling station as a drowning case and hands free two way communication between the person requesting assistance and the EMS station allowing the person activating the system to start first aid or receive instructions from a professional on the actions to be taken to mitigate threat to life.

Exemplary Packaging

Figure 1A:
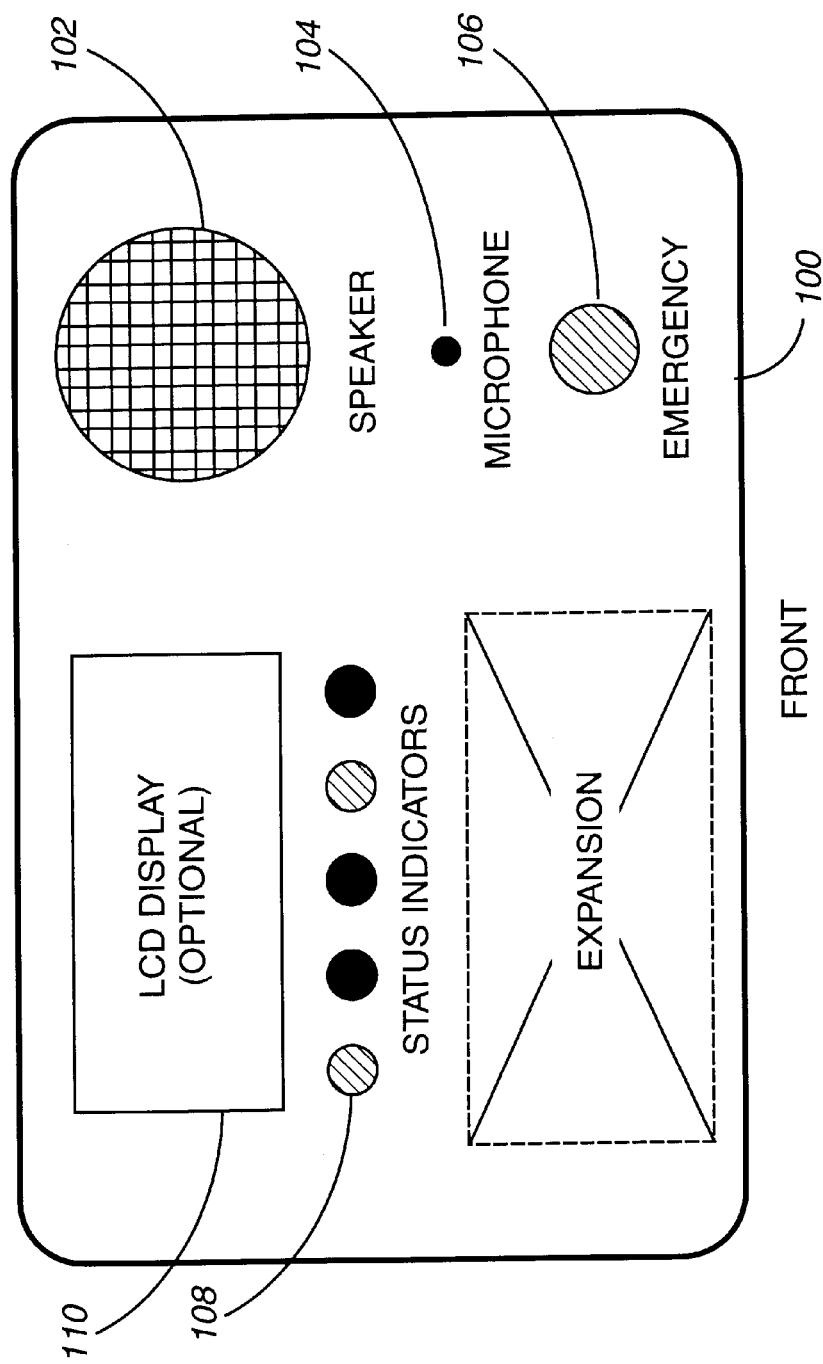
FIG. 1A is a top view of the emergency telecommunications device and FIG. 1B a side view of the emergency telecommunications device, according to the present invention.
Figure 1B:
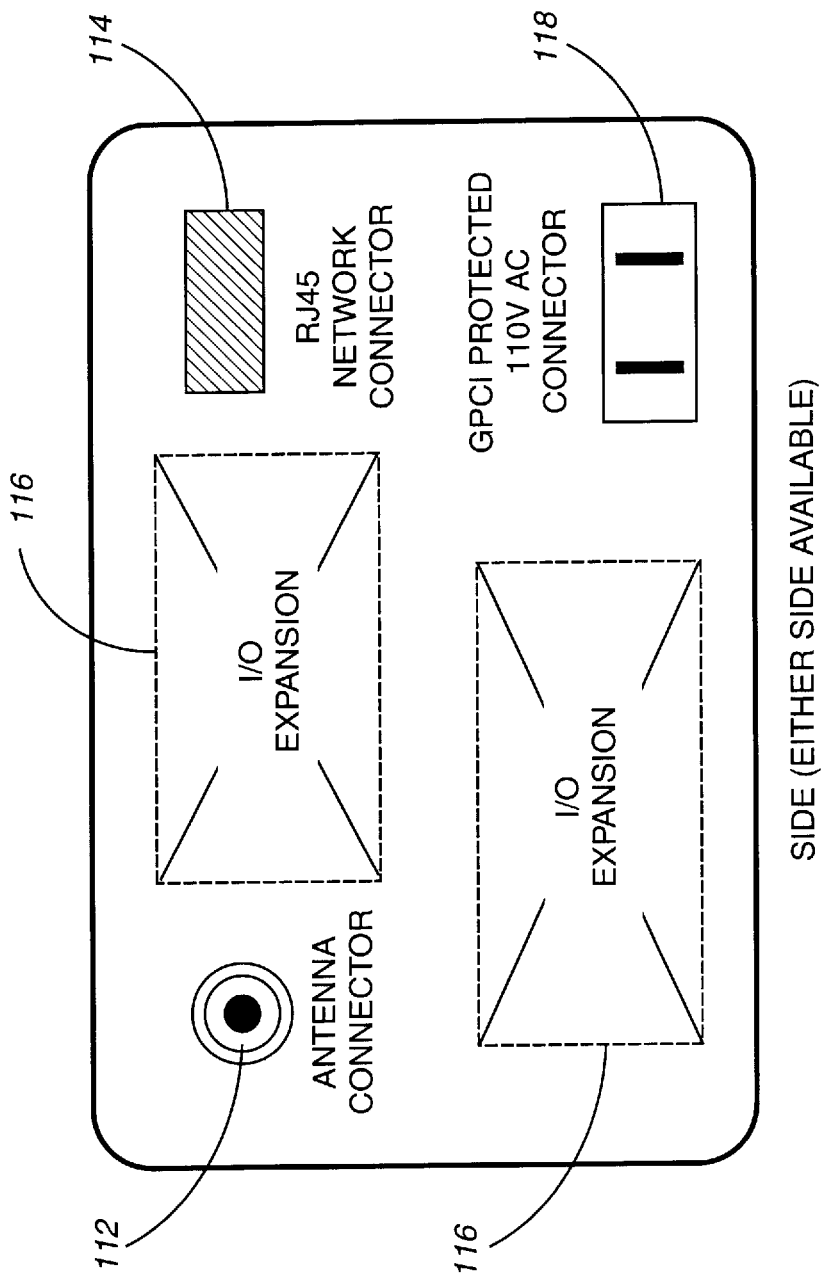

FIG. 1A is a top view of the emergency telecommunications device and FIG. 1B a side view of the emergency telecommunications device, according to the present invention. A set of status indicators 108, provide feedback on several events including whether the communication line is available and connected, is there power to the unit, is the unit in use, and is there a communications problem. An optional LCD display augments the status indicators 108 to provide one or more text lines of information. In one embodiment, the LCD is used in a multilingual mode, to provide prompts in a select national language such as English, French, Spanish, Italian, Japanese and more. The packaging 100 is any weatherproof material such as plastic or metal. The packaging holds the circuitry described further below in FIGS. 2 and 3. Shown is a speaker 102 and a microphone 104 and an activate button 106.

FIG. 1B shows a corresponding side view of the telecommunications device of FIG. 1A with an antenna connector 112 for wireless installation, a RJ45 network connection 114 for LAN based connection, I/O interface areas 116 for coupling to external Input/Output points (I/O) such as alarms, sirens, strobe lights and more. A ground fault protected A/C connector is provided also for providing power to the auxiliary devices that interface with the I/O points 116 and/or interface to power line devices such as X-10 bus.

It should be noted that this packaging is exemplary and that present invention can be implemented in a variety of packaging types, which are within the true scope, and spirit of the present invention.

Exemplary Circuitry

Figure 2:
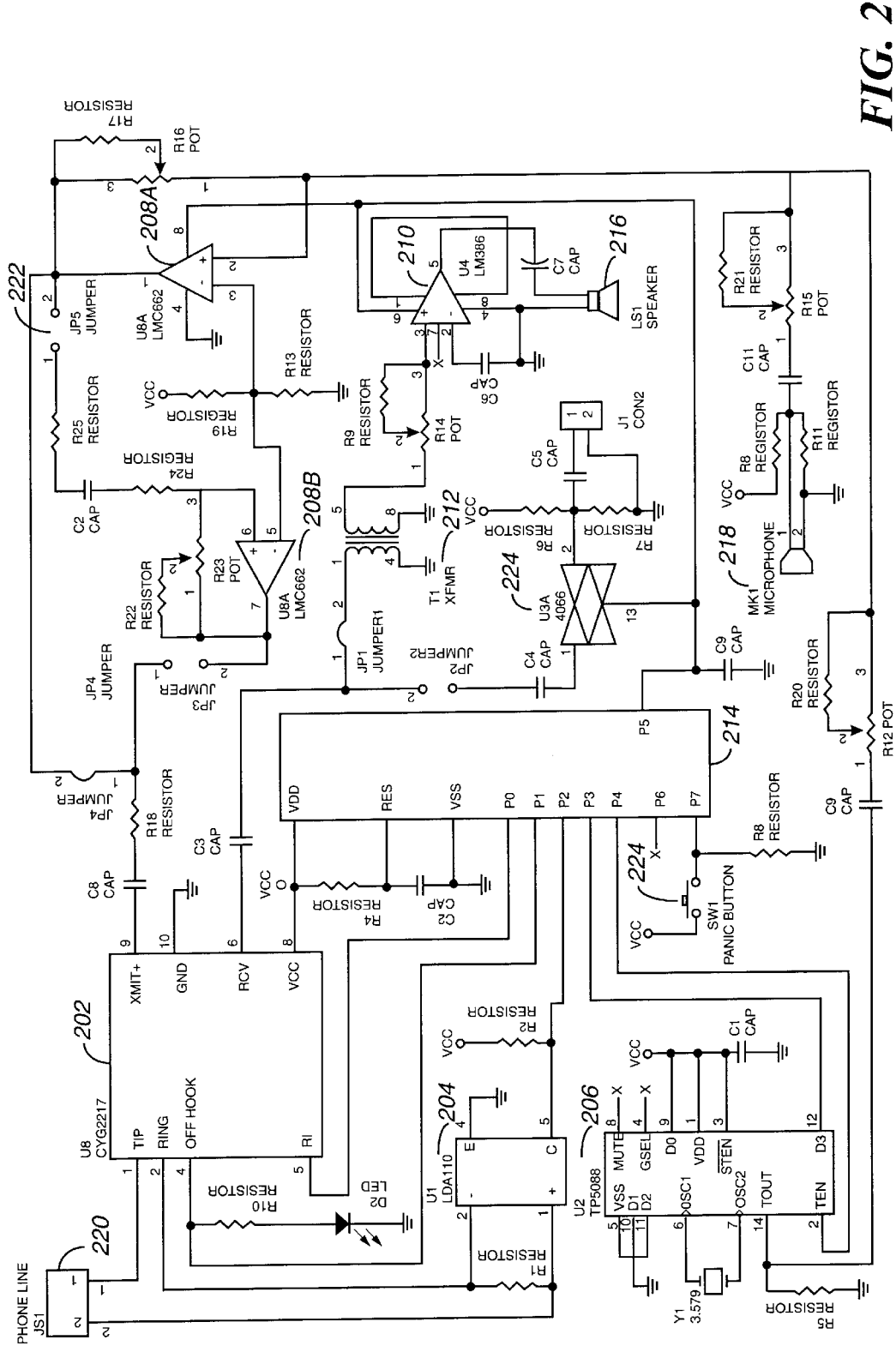
FIG. 2 is an electrical schematic of the circuitry of the telecommunications device of FIG. 1, according to the present invention.

FIG. 2 is an electrical schematic 200 of the circuitry of the telecommunications device of FIG. 1 according to the present invention. The system is implemented in a variety of settings and situations; however, the initially preferred implementation is in the residential and hostelry arenas. With little effort, "Lifeguard can be installed poolside at private homes, hotels, inns, clubs and motels. The relatively small size and light weight makes installation a simple task and the only requirement is the presence of a telephone (PSTN) line and 120 VAC (common household voltage).

The main components of the circuitry 200 are:

CYG2217 CP Clare DAA Module (202)

LDA110 Solid State Current Sensor (204)

TP5088 National Semiconductor DTMF Generator (206)

LMC662 National Semiconductor OP AMP (208A and 208B)

LM386 National Semiconductor 2W PA AMP (210)

273-1380 Radio Shack Audio Transformer (212)

STAMP1 Microcontroller (or PIC equivalent) (214)

Speaker 2 W 8 ohm (216)

Microphone Condensor-type (218)

Miscellaneous resistors, capacitors, potentiometers, LED, NO-switch, crystals

In another embodiment, the microcontroller (214) is replaced with a programmable device such as a field programmable gate array or programmable logic array (PAL). Whereas the logic in conventional chips is permanently etched in silicon, PAL devices can be reprogrammed on the fly. Therefore, this embodiment provides the benefits of a hardware implementation—durability and speed—with the functionality of a programmable microprocessor, which can be reprogrammed to perform different tasks.

Exemplary Incoming Call Flow

If a call to a preprogrammed number is disconnected, the device has a "call sense circuit" that is capable of automatically detecting and answering a call back to the device. The "call sense circuit" operates as follows. A PSTN line (220) connects to CYG2217 module (202) via standard RJ11 connector. CYG2217 (202) detects ringing voltage and RI pin goes from ±5VDC to 0VDC. STAMP1 (214) pin P0 detects state-change and raises P1 and P6 to +5VDC. CYG2217 (202) "answers" call. Loop current is monitored by LDA110 (204) via "active low" state on STAMP1 (214) P2 (if party on remote end hangs up—the LDA110 output to STAMP1 P2 changes to +5VDC). Audio from remote party is sent from CYG2217 (202) RCV pin to Radio Shack 273-1380 audio transformer (212) where the signal is amplified to a 500 mv level (approximate). NOTE: Audio may also be sent directly to a line level (0 dbm) output for connection to a PA system. Audio is coupled to the LM386 (210) PA Amp via a 10 k pot (level adjustment) and the LM386 (210) amplifies the audio to a level of 2 watts. (NOTE: STAMP1 (214) P5 controls VDD power to the LMC662 (208). When the system is in standby—no call— power to the LMC662 (208A) is off thereby keeping room noise from being heard out the speaker.) Local audio is received via a highly sensitive condenser microphone. This signal is fed into a LMC662 (208A) OP AMP for amplification (input level may be adjusted via 10 k pot). Audio out from the LMC662 OP AMP may be adjusted via a 200 k pot. ((NOTE: Additional mic audio amplification can be accomplished by routing audio to the $2^{nd}$ side of the LMC662 (208B) via a jumper (222). Mic audio can be amplified substantially—up to a 2V peak-to-peak)). Following amplification, audio is fed to the CYG2217 (202) XMIT pin, and on to the remote party via the PSTN line (220). The call is terminated when the remote party hangs-up, or when the "panic" button (224) is pressed.

In one embodiment, the number is "pre-programmed" at the factory or programmed by the emergency support personnel during the initial installation. In another embodiment, the number is remotely programmed and changed by emergency response personnel by a central computer (not shown) such as the Lifeguard communication center as described below.

Outgoing Call Scenario

A single panic button is used for "seizing control" of the telecommunications line. The term "seizing control" of the telecommunications line is defined as follows. User "presses" the panic button (224) and STAMP1 (214) P7 goes high. The STAMP1 (214) raises P6 and lights the off-hook LED. STAMP1 (214) P1 goes high and the PSTN line is seized. STAMP1 (214) pins P3 and P4 signals TP5088 (206) to generate DTMF tones. At this time STAMP1 (214) P5 goes high and activates the LMC662 (208) microphone circuit. Ring-back is heard through the speaker (216). Remote party answers audio heard through the speaker (216)—local audio is sent by a microphone. Call terminates when remote party hangs-up, or when local party presses the "panic button" (224).

Incoming Call Scenario—No Answer

PSTN line (220) connects to CYG2217 (202) via standard RJ11 connector (220). CYG2217 (202) detects ringing voltage and RI pin goes from +5VDC to 0VDC. STAMP1 (214) pin P0 detects state-change and DOES NOT raise P1 and P6 to +5VDC. CYG2217 (202) DOES NOT "answer" call. Loop current is NOT monitored by LDA110 (204). Audio from remote party is STILL sent from CYG2217 (202) RCV pin to Radio Shack 273-1380 audio transformer (212) where the signal is amplified to a 500 mv level (approximate). Audio is coupled to the LM386 (210) PA Amp via a 10 k pot (level adjustment). However, the LM386 (210) does not amplify the audio (NOTE: STAMP1 P5 controls VDD) power to the LMC662 (208), LM386 (210) and LM4066 (224). When an incoming call comes in, system is in standby—and there is no power to the LMC662 (208), LM386N (210), and LM4066 (224)—thereby keeping all audio from being heard out of the speaker.

Exemplary Circuitry

Figure 3:
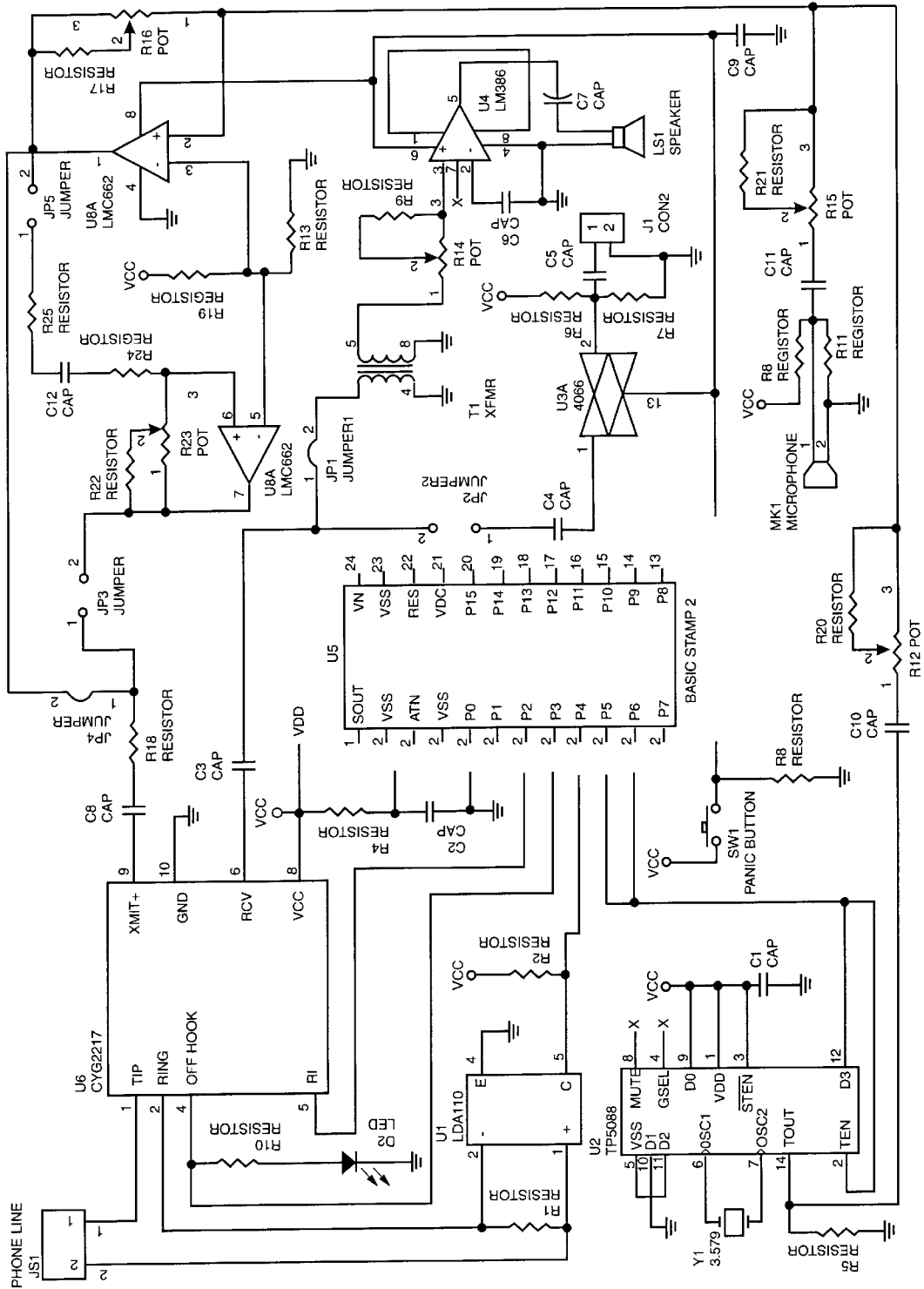
FIG. 3 is an electrical schematic of an alternative embodiment of the circuitry of FIG. 2, according to the present invention.

FIG. 3 is an electrical schematic 300 of an alternative embodiment of the circuitry of FIG. 2, according to the present invention. This microprocessor possesses more memory space to allow code expansion. Code expansion includes software to add additional features and functionality to the device of FIG. 2. Additionally, eight more I/O pins are available as well as a dedicated serial data port that provides asynchronous serial data communications at speeds up to 38,400 bits-per-second. Code execution speed is substantially increased. The additional I/O pins allow hotels, inns and motels to passive-infra-red or contract switch "alarm" the areas of interest and signal/call the security/front desk instead of emergency centers for after hours access. Not that one area requires 10 inputs. In one embodiment, the device(s) are distributed around to cover poorly lit areas such as outdoor concessions areas, parking lots, hotel payphone areas, and more. Most hotels around here and in the Midwest have "summer" outdoors pools, which are enclosed in a metal fence or concrete wall, barrier, outside the hotel.

FIGS. 4 and 5, add-on U1A TX MODULE and U2A RX MODULE (404) provide wireless, two-way communication capabilities between multiple emergency devices 100 and/or a Monitoring Center such as the Lifeguard Communication Center, which is any Microsoft® Wiindows™ based personal computer coupled to a communications port such as Ethernet, using a Lifeguard Communication center software application. Communications between Lifeguard units and the Lifeguard communication center occurs over either a 10 base-T network, RF wireless network, X-10 network, or directly connected using a cable. Typically a directly connected PC has two serial ports to be able to completely interface with all the features of the Lifeguard unit.

In one embodiment, the TX_MODULE is even integrated with a remote sensor, contact or switch to provide wireless 'sensor' capabilities. These modules are used with both the embodiments of the device 200 and device 300. The I/O pins of the microprocessor 214 are used for this embodiment. Note the exact port assignment is not important and can be set upon Lifeguards I/O configurations during installation.

In another embodiment, add-on U3A X-10LINE MODULE in FIG. 6 allows integration with virtually any X-10 home automation system or X-10 automation component. Or, use the X-10 LINE MODULE for communications between device 200 or device 300 and/or a LIFEGUARD monitoring center. This X-10 module is used with both the embodiments of the device 200 and device 300. The I/O pins of the microprocessor 214 are used for this embodiment.

In another embodiment, add-on U4A NTSC/PAL CHARACTER GENEPATOR in FIG. 7 allows integration with a cable TV or CCTV system. This module provides display text messages on a TV screen. This NTSCL/PAL module is used with both the embodiments of the device 200 and device 300. The I/O pins of the microprocessor 214 are used for this embodiment.

In another embodiment, add-on K1 RELAY 4PDT of FIG. 8 provides four normally open and four normally closed relay contacts for use with external devices and/or equipment. This mechanical relay is used with both the embodiments of the device 200 and device 300. The I/O pins of the microprocessor 214 are used for this embodiment.

In still another embodiment, add-on U5A OPTICAL ISOLATION SWITCH of FIG. 9 provides two switch outputs which are electrically isolated from the LIFEGUARD system. These outputs are either normally open or normally closed. This optical relay is used with both the embodiments of the device 200 and device 300. The I/O pins of the microprocessor 214 are used for this embodiment.

Figure 10:
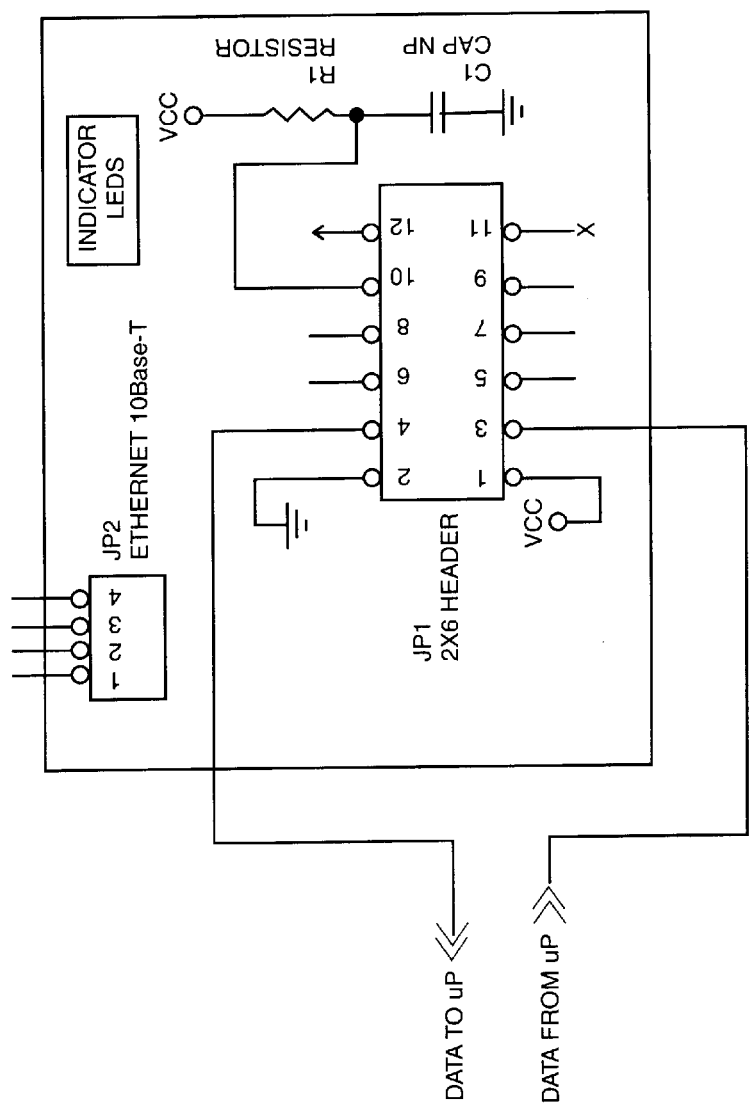
FIG. 10 is an electrical schematic of an optional add-on to the circuitry of FIGS. 2 and 3 for a network interface module, according to the present invention.

In yet still another embodiment, add on NET_MOD1 NETWORK INTERFACE MODULE of FIG. 10 allows integration with an Ethernet network via an RJ45 connector. This module supports IP, ARP, UDP, TCP, DHCP, SNMP and TFTP protocols. Asynchronous, TTL signals to/from the LIFEGUARD system(s) are sent over any 10 Base-T network. This mechanical relay is used with both the embodiments of the device 200 and device 300. The I/O pins of the microprocessor 214 are used for this embodiment.

Exemplary Hotel Installation

Figure 11:
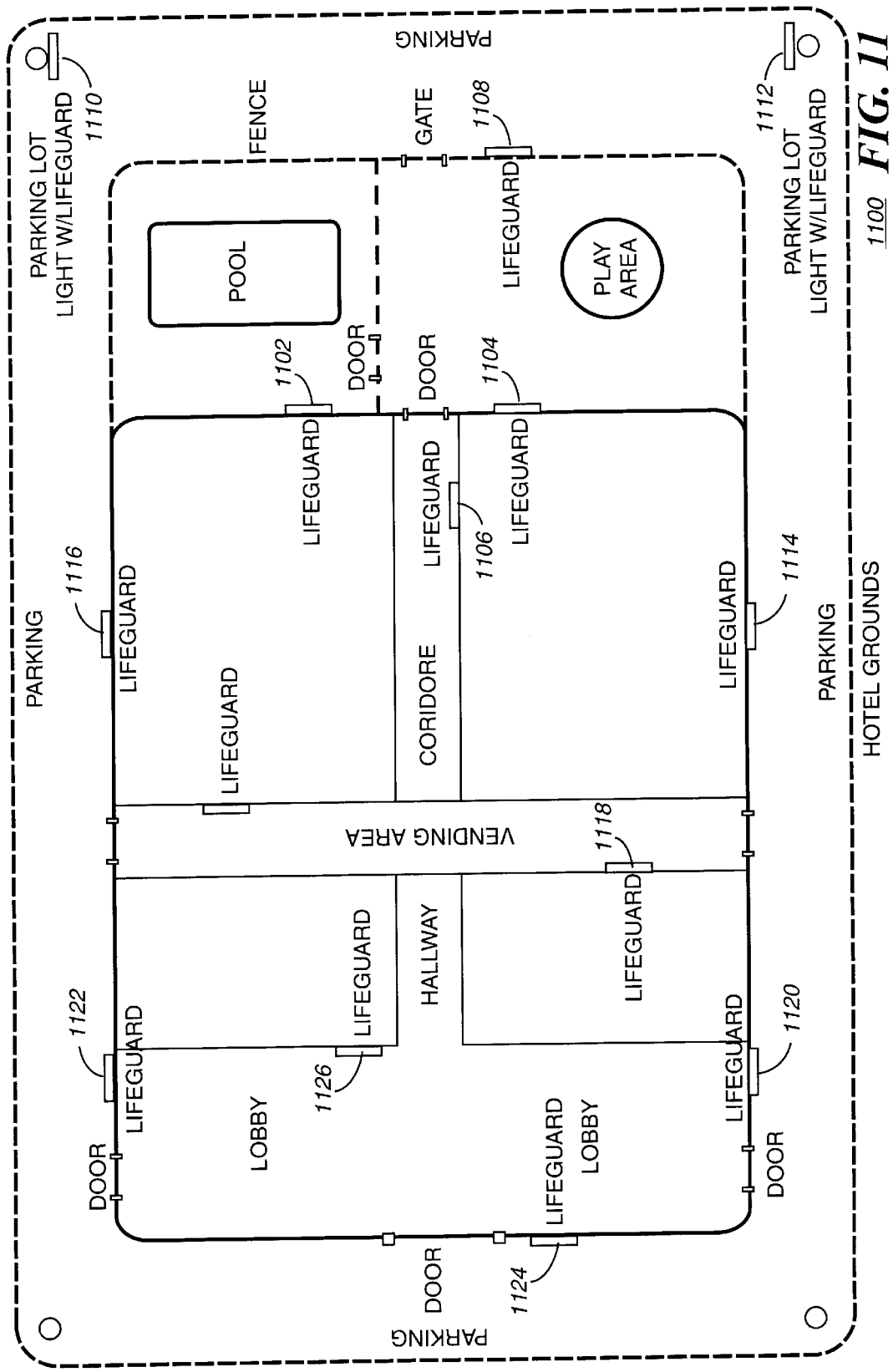
FIG. 11 is a typical installation of the telecommunication device of FIG. 1 in a hotel, according to the present invention.

FIG. 11 is a typical installation 1100 of the telecommunication device of FIG. 1 in a hotel, according to the present invention. It is important to note that Lifeguard can be installed in multiple areas and is not limited to pools. Shown are Lifeguard units stored in many different areas including pool areas 1102, play areas 1104, hallways 1106, exit entrance areas 1108, 1120, 1122, 1124, parking lots 1110, 1112, 1114, 1116, vending areas 1118, and lobbies 1126. Each Lifeguard unit is capable of being networked either wireless, wired or direct connection through PSTN back to the monitoring station as shown in FIG. 12 below.

Exemplary Monitoring Station

Figure 12:
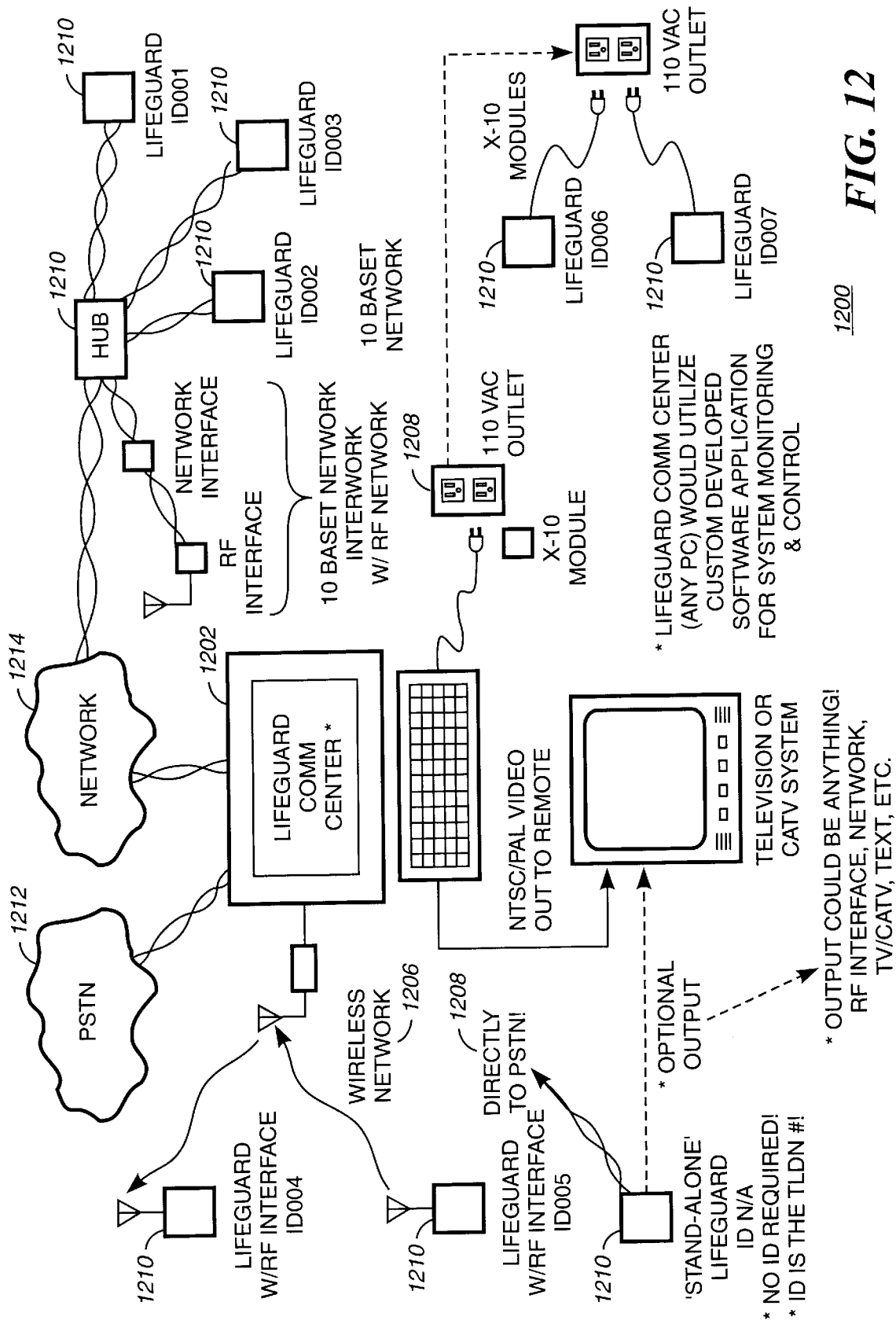
FIG. 12 is a typical monitoring station or Lifeguard Communication Center for communicating with one or more devices installed, according to the present invention.

FIG. 12 is a typical monitoring station or Lifeguard Communication Center 1200 for communicating with one or more devices installed, according to the present invention. As described above, a Lifeguard Communication Center 1202 is any Microsoft® Wiindows™ based personal computer coupled to a communications port such as Ethernet, using a Lifeguard Communication center software application. Communications between Lifeguard units 1210 and the Lifeguard communication center (1202) occurs over either a 10 base-T network 1204, RF wireless network 1206, X-10 network 1208, PSTN 1206 or directly connected using a cable or PSTN 1208. Typically a directly connected PC has two serial ports to be able to completely interface with all the features of the Lifeguard unit. Each Lifeguard unit 1210 is set to a unique network address as shown in FIG. 12 (e.g., ID001, ID002, ID003, ID004, ID005, ID006, and ID007).

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A weather resistant emergency call device for establishing a communications session with a trained emergency response personnel to aid a rescuer on a scene with a victim of an accident, the device comprising:
   an electronic telecommunications circuit comprising:
      a network interface using internet protocol (IP) to a telecommunications line to enable multiple simultaneous communications to at least two emergency call devices;
      a single button for seizing control of the telecommunication line with a dialer for dialing a pre-programmed telephone number of emergency response personnel and for establishing a connection therewith;
      a speaker with an amplifier coupled to the interface for reproducing one or more voice instructions coming from the emergency response personnel;
      a microphone coupled to the interface, the microphone including at least two automatic gain amplifier circuits for amplifying the signal received so as to allow communications from a rescue personnel aiding a victim of an accident at a distance greater than fifteen feet; and
   a weather-proof chassis for holding the electronic communication circuitry.

2. The device according to claim 1, further comprising:
   a set of diagnostic indicators providing a user with feedback, including whether the telecommunication line is connected, whether there is power to the unit, whether the unit is in use, and whether there is a communications problem.

3. The device according to claim 1, wherein the pre-programmed telephone number is pre-programmed at a factory or programmed during an initial installation of the device.

4. The device according to claim 1, wherein the circuit further comprises:
an interface to an antenna for providing communication over free-space to a monitoring center.

5. The device according to claim 1, wherein the circuit further comprises:
a call sense circuit that monitors if a call to a preprogrammed number has been disconnected and if the call has been disconnected, the call sense circuit automatically answers the next callback to the device.

6. A weather resistant emergency call device for establishing a communications session with a trained emergency response personnel to aid a rescuer on a scene with a victim of an accident, the device comprising:
an electronic telecommunications circuit comprising:
a network interface using internet protocol (IP) to a telecommunications line to enable multiple simultaneous communications to at least two emergency call devices;
a single button for seizing control of the telecommunication line with a dialer for dialing a pre-programmed telephone number of emergency response personnel and for establishing a connection therewith;
a speaker with at least two automatic gain amplifier circuits for coupled to the interface for reproducing one or more voice instructions coming from the emergency response personnel;
a microphone coupled to the interface, the microphone including an automatic gain amplifier circuit for amplifying the signal received so as to allow communications from a rescue personnel aiding a victim of an accident at a distance greater than fifteen feet;
a microprocessor for controlling the call flow into and out of the emergency call device, including a means for programming the pre-programmed telephone number control; and
a weather-proof chassis for holding the electronic communication circuitry.

7. The device according to claim 6, wherein the circuit further comprises:
an interface for connecting with an X-10 device for sending X-10 compatible commands in response to an activation of the single button.

8. The device according to claim 6, wherein the circuit further comprises:
an interface for connecting with a NTSC/PAL character generator for sending preprogrammed text in response to the activation of the single button.

9. The device according to claim 6, wherein the circuit further comprises:
an interface for connecting with an Ethernet network interface module for sending pre-programmed signal in response to the activation of the single button.

10. The device according to claim 6, wherein the circuit further comprises:
an interface for connecting with a RELAY 4PDT, which provides four normally open and four normally closed relay contacts for use with external devices, wherein the four normally open contacts are closed in response to the activation of the single button.

11. The device according to claim 6, wherein the circuit further comprises:
an interface for connecting with a U5A OPTICAL ISOLATION SWITCH, which provides two switch outputs which are electrically isolated from the system, wherein the two normally open switch outputs are closed in response to the activation of the single button.

12. The device according to claim 6, wherein the circuit further comprises:
a set of diagnostic indicators providing a user with feedback, including whether the telecommunication line is connected, whether there is power to the unit, whether the unit is in use, and whether there is a communications problem.

13. The device according to claim 12, wherein the set of diagnostic indicators further comprises:
an LCD display for providing one or more text lines of information.

14. The device according to claim 13, wherein the LCD display further comprises:
a multilingual mode to provide prompts in a national language selected from the group of national languages consisting of English, French, Spanish, Italian, and Japanese.

15. The device according to claim 6, wherein the pre-programmed telephone number is pre-programmed at a factory or programmed during an initial installation of the device.

16. The device according to claim 6, wherein the pre-programmed telephone number is remotely programmed and changed by support personnel using a central computer.

17. The device according to claim 6, wherein the microprocessor further comprises:
a program to access backup numbers stored in the device and automatically dial the backup numbers in case the call initiated by activating the device goes unanswered after a predetermined number of rings.

18. The device according to claim 17, wherein the microprocessor further comprises:
a program to automatically answer a callback when a call is disconnected.

19. The device according to claim 17, wherein the microprocessor further comprises:
a program to automatically redial a number when a call is disconnected and no callback occurs within a set period.

20. The device according to claim 6, wherein the circuit further comprises:
an interface for connecting to an antenna for providing communication over free space to a monitoring center.

21. The device according to claim 6, wherein the circuit further comprises:
an interface for connecting to an RJ45 connector for LAN based communication.

22. A system for contacting emergency medical services (EMS), the system comprising:
two or more emergency call devices coupled together over a local area network to enable multiple simultaneous communications, each of the emergency call device comprising:
an electronic telecommunications circuit comprising:
an interface to a telecommunications line;
a single button for seizing control of the telecommunication line with a dialer for dialing a pre-programmed telephone number of emergency response personnel and for establishing a connection therewith;
a speaker with an amplifier coupled to the interface for reproducing one or more voice instructions coming from the emergency response personnel;

a microphone coupled to the interface, the microphone including at least two automatic gain amplifier circuits for amplifying the signal received so as to allow communication from a rescue personnel aiding a victim of an accident at a distance greater than fifteen feet; and a weather-proof chassis for holding the electronic communication circuitry, whereby the system provides a coverage area which is greater than a coverage area defined by the capabilities of the microphone and the speaker of one emergency call device.

23. The system according to claim 22, further comprising:

a monitoring station for communicating with one or more emergency devices, according to the present invention, wherein the monitoring station is a personal computer coupled to an Ethernet communications port.

24. The system according to claim 22, wherein the local area network coupling the two or more emergency call devices is a wireless network based upon BlueTooth technology.

25. The system according to claim 22, wherein the local area network coupling the two or more emergency call devices to a monitoring station is a wireless network based upon BlueTooth technology.

26. The system according to claim 22, further comprising:

input/output interfaces for coupling to other warning devices selected from the group of warning devices consisting of alarms, sirens, and strobe lights.

27. The system according to claim 26, wherein the input/output interfaces couple network cameras for recording and monitoring events within the coverage area, when the single button is activated.

28. The system according to claim 22, further comprising an interface to an antenna for receiving an activation signal from a wireless device to activate the single button, so that the wireless device remotely alerts the system that an emergency has occurred.

* * * * *